United States Patent [19]
Hyzin

[11] Patent Number: 6,069,992
[45] Date of Patent: May 30, 2000

[54] CONNECTOR SYSTEM WITH PRECISION ALIGNMENT

[75] Inventor: Peter Joseph Hyzin, Lake Forest, Calif.

[73] Assignee: ITT Manufacturing Enterprises, Inc., Wilmington, Del.

[21] Appl. No.: 08/967,970

[22] Filed: Nov. 12, 1997

Related U.S. Application Data

[62] Division of application No. 08/744,127, Nov. 5, 1996, Pat. No. 5,778,121.

[51] Int. Cl.[7] .................................................... G02B 6/38
[52] U.S. Cl. .............................. 385/55; 385/59; 385/60; 385/64; 385/66; 439/680; 439/681
[58] Field of Search ....................... 439/680, 681; 385/55, 56, 58, 59, 60, 64, 66, 138

[56] References Cited

U.S. PATENT DOCUMENTS

| | | | |
|---|---|---|---|
| 4,082,421 | 4/1978 | Auracher et al. | 350/96.22 |
| 4,111,522 | 9/1978 | Auracher et al. | 350/96.21 |
| 4,140,366 | 2/1979 | Makuch et al. | 350/96.22 |
| 4,140,367 | 2/1979 | Makuch et al. | 350/96.22 |
| 4,245,875 | 1/1981 | Shaffer et al. | 439/680 |
| 4,277,135 | 7/1981 | Schrott et al. | 350/96.21 |
| 4,445,750 | 5/1984 | Grois et al. | 350/96.21 |
| 4,544,233 | 10/1985 | Iwamoto et al. | 350/96.2 |
| 4,597,631 | 7/1986 | Flores | 350/96.2 |
| 4,822,130 | 4/1989 | Maranto et al. | 350/96.2 |
| 4,895,425 | 1/1990 | Iwano et al. | 350/96.2 |
| 4,976,510 | 12/1990 | Davila et al. | 385/135 |
| 4,993,803 | 2/1991 | Suverison et al. | 385/88 |
| 5,067,783 | 11/1991 | Lampert | 385/60 |
| 5,216,732 | 6/1993 | Knott | 385/59 |
| 5,239,983 | 8/1993 | Katsurada | 439/171 |
| 5,372,517 | 12/1994 | Levesque | 439/680 |
| 5,385,481 | 1/1995 | Kotyuk | 439/378 |
| 5,386,486 | 1/1995 | Fan et al. | 385/59 |
| 5,392,371 | 2/1995 | Morlion et al. | 385/52 |
| 5,430,819 | 7/1995 | Sizer, II et al. | 385/59 |
| 5,466,171 | 11/1995 | Bixler et al. | 439/378 |
| 5,515,465 | 5/1996 | Olin et al. | 385/64 |

FOREIGN PATENT DOCUMENTS

| | | |
|---|---|---|
| 0 292 024 A2 | 11/1988 | European Pat. Off. . |
| 0 458 608 A1 | 11/1991 | European Pat. Off. . |
| 0 468 671 A1 | 1/1992 | European Pat. Off. . |
| 0505197 | 9/1992 | European Pat. Off. . |
| 0 581 527 A1 | 2/1994 | European Pat. Off. . |
| 62-023011 | 1/1987 | Japan . |
| 63-055507 | 3/1988 | Japan . |
| 63-085522 | 4/1988 | Japan . |
| 1-217270 | 8/1989 | Japan . |
| 3-257406 | 11/1991 | Japan . |
| 687105 | 10/1994 | Switzerland . |

*Primary Examiner*—Hung N. Ngo
*Attorney, Agent, or Firm*—Thomas L. Peterson

[57] ABSTRACT

A system includes mateable connectors (12, 14) with mateable optic fiber termini, which provides for precision alignment of the termini and which facilitates installation of an insert whose front end must be of rectangular shape. Two mating sets of optic fiber termini (30, 32) are precisely aligned by a pair of pin-receiving alignment holes (44, 46) in one connector and a pair of pins (40, 42) projecting from the other connector, wherein a first (40) of the alignment pins is precisely cylindrical and fits closely in the first hole, and a second (42) of the pins is also precisely cylindrical but fits into a hole (46) that is elongated in a direction toward and away from the first hole. A front portion (110) of an insert is of largely rectangular cross-section, while the rear portion (112) of the insert is of largely circular cross-section to enable retention by a circular retainer clip (120) and to provide threads (122) for threading into a backshell.

6 Claims, 5 Drawing Sheets

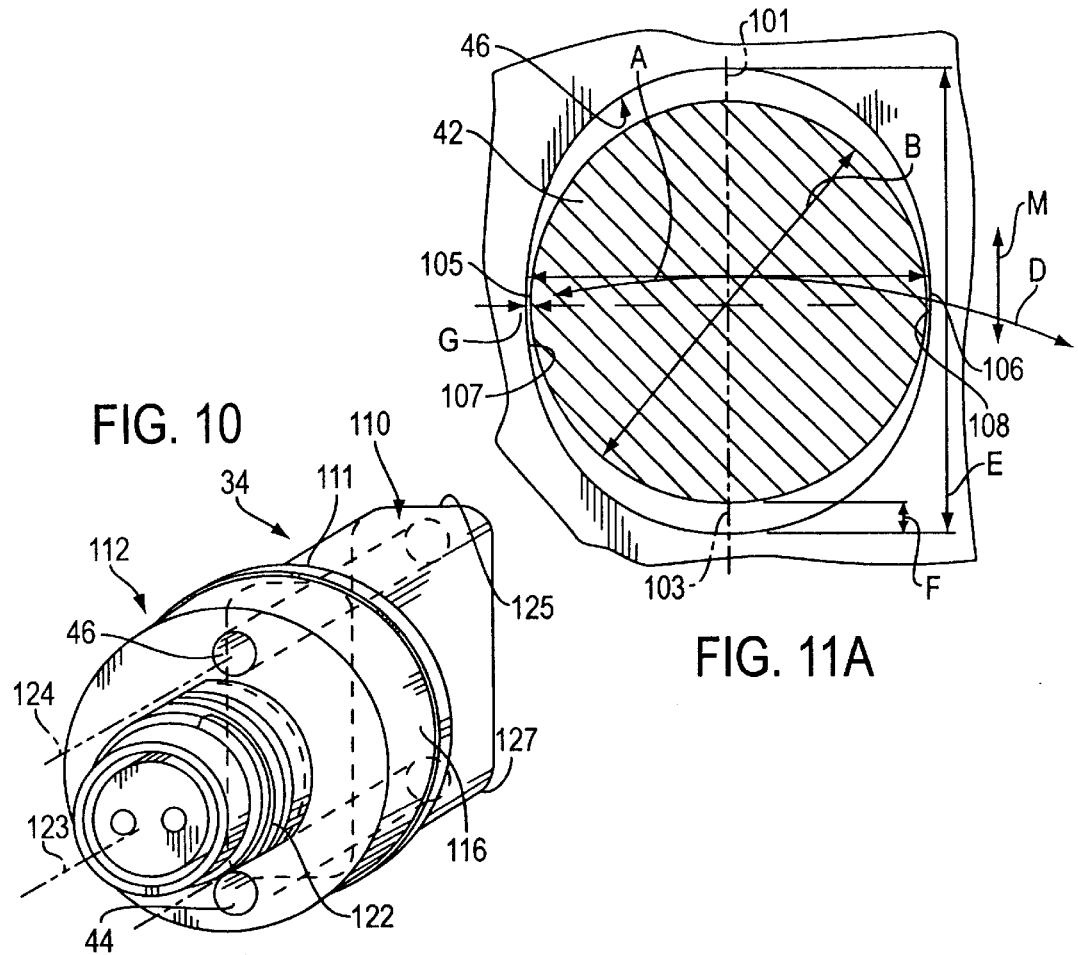
FIG. 10
FIG. 11A
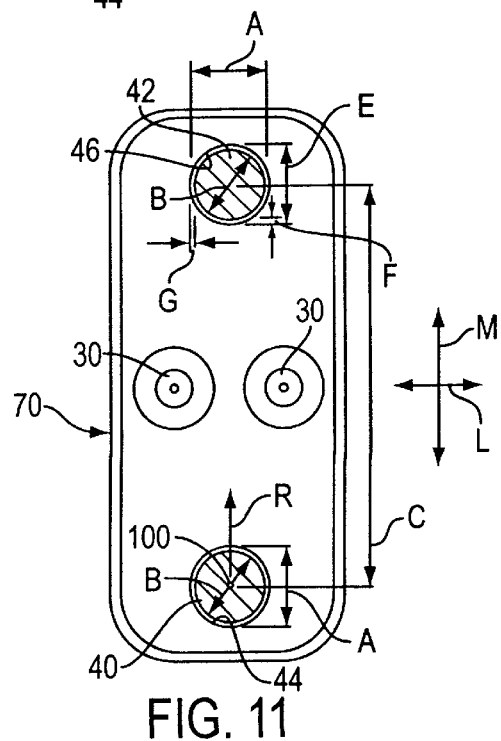
FIG. 11
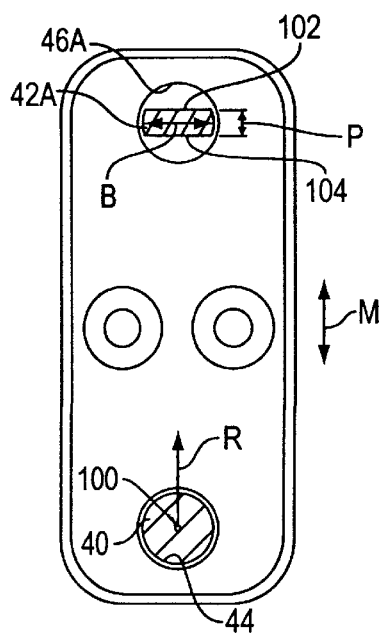
FIG. 12

6,069,992

CONNECTOR SYSTEM WITH PRECISION ALIGNMENT

CROSS REFERENCE

This is a division of U.S. patent application Ser. No. 08/744,127 filed Nov. 5, 1996, now U.S. Pat. No. 5,778,121.

BACKGROUND OF THE INVENTION

There have been attempts to incorporate fiber optic termini in standard rack and panel electrical contact connectors. In such connectors, largely elongated rectangular inserts are mounted in elongated housings, and a number of such connectors may be arranged in a row. When adapting this type of connector to optic termini wherein the tips of a pair of mating optical fibers must precisely abut one another, high precision is required to assure that the tips of the fibers are in line and the fibers extend parallel. A connector system which assured reliable mating of optical fiber termini, especially in standard rack and panel connector housings, would be of value.

SUMMARY OF THE INVENTION

In accordance with one embodiment of the present invention, a connector and connector system are provided, which include fiber optic termini, which assure precise alignment of mating termini and which facilitate retention and coupling to an optic fiber insert whose front end must be rectangular. A second connector has a housing with a pair of alignment bores, while a first connector has a pair of projecting alignment pins for reception in the bores. A first pin is of cylindrical shape and is very closely received in a first cylindrical bore, while the second pin is cylindrical but is received in a bore that is elongated in a direction radial to the first bore. This results in the second pin being precisely angularly positioned with respect to the axis of the first pin, but not radially positioned with respect to the axis of the first pin.

An insert for one connector has a rectangular front portion for closely fitting in a rectangular bore of the corresponding housing. However, the rear of the insert is of circular cross-sections, to enable use of a circular retention clip and to provide a thread for engagement with a backshell.

The novel features of the invention are set forth with particularity in the appended claims. The invention will be best understood from the following description when read in conjunction with the accompanying drawings.

BRIEF DESCRIPTION OF THE DRAWINGS

FIG. 10 is a rear isometric view of the fiber optic insert of the second, or plug connector of FIG. 1.

FIG. 11 is a partial front elevation view of the plug connector of FIG. 6, and including sectional views of alignment pins inserted into alignment bores of the plug connector.

FIG. 11A is an enlarged view of a portion of FIG. 11.

FIG. 12 is a view similar to that of FIG. 11, but showing another embodiment of the invention.

DESCRIPTION OF THE PREFERRED EMBODIMENTS

Figure 1:
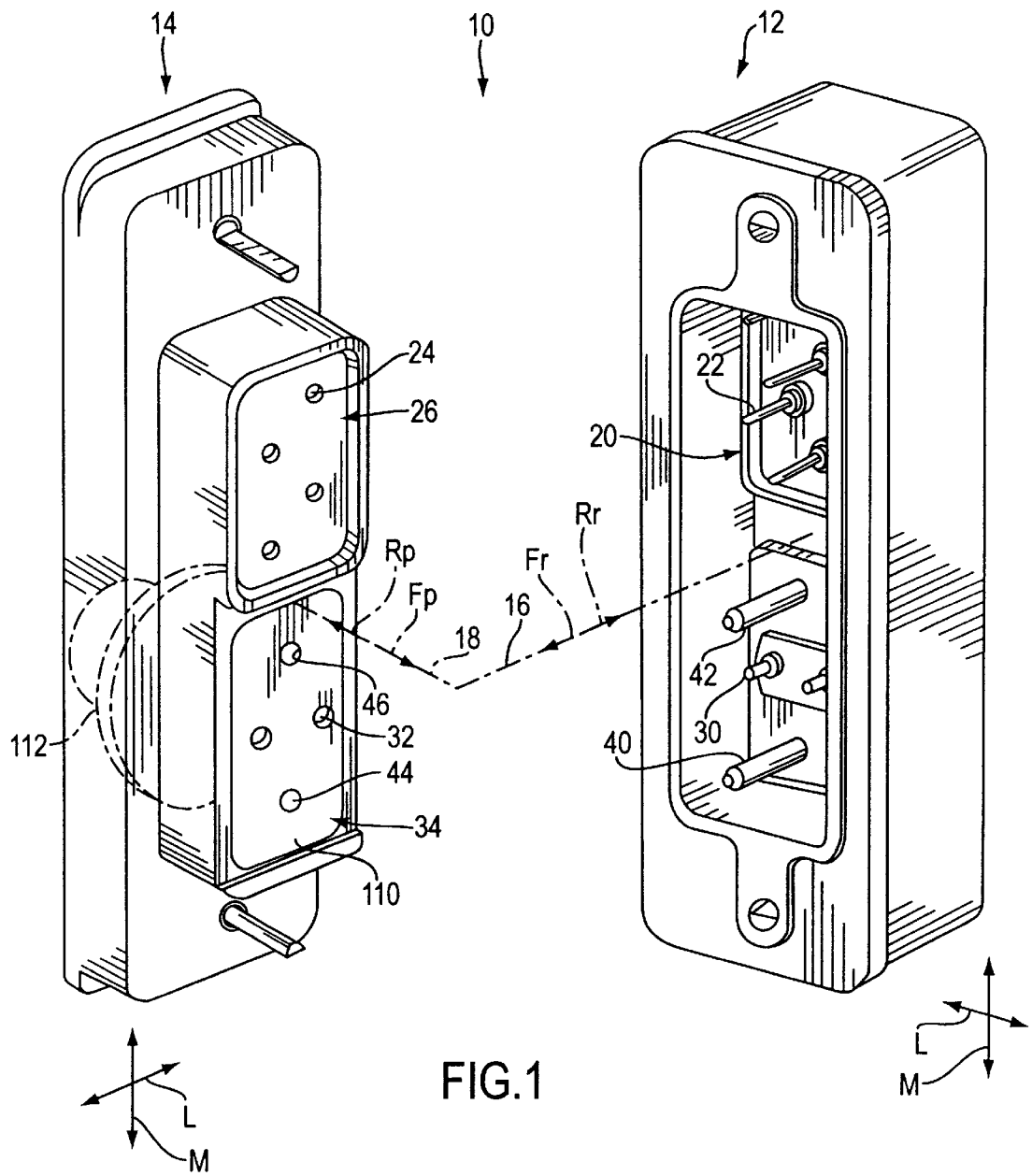
FIG. 1 is an exploded isometric view of a connector system of the present invention, showing receptacle and plug connectors thereof.

FIG. 1 illustrates a connector system 10 which includes a first or receptacle connector 12 and a second or plug connector 14 that can mate by moving the connectors together along their axes 16, 18. Each of the axes extend in corresponding forward and rearward directions Fr, Rr for receptacle connector and Fp, Rp for the plug connector. Each connector is elongated in a longitudinal direction M and is shorter in a perpendicular lateral direction L, with directions M, L being perpendicular to the forward and rearward directions for each connector. The first connector 12 has an electrical contact insert 20 that includes a plurality of electrical pin contacts 22. The pin contacts mate with socket contacts 24 of an electrical contact insert 26 of the second connector. The first connector also includes a pair of connector elements in the form of butt-joint optical termini 30 that can mate with corresponding termini 32 of a fiber optic insert 34 of the second connector. When electrical contacts such as 22, 24 mate, it is necessary that they be aligned with moderate accuracy, such as with the axes of the corresponding pin and socket contacts being aligned within a few thousandths inch and within a few degrees. However, when the optic termini are to be mated, they must be aligned with higher precision, such as being coaxial within about one-thousandth inch and with an angular misalignment within about one degree. A pair of alignment pins 40, 42 of the first connector are received in a pair of alignment bores 44, 46 of the second connector, to assure such precision alignment.

Figure 2:
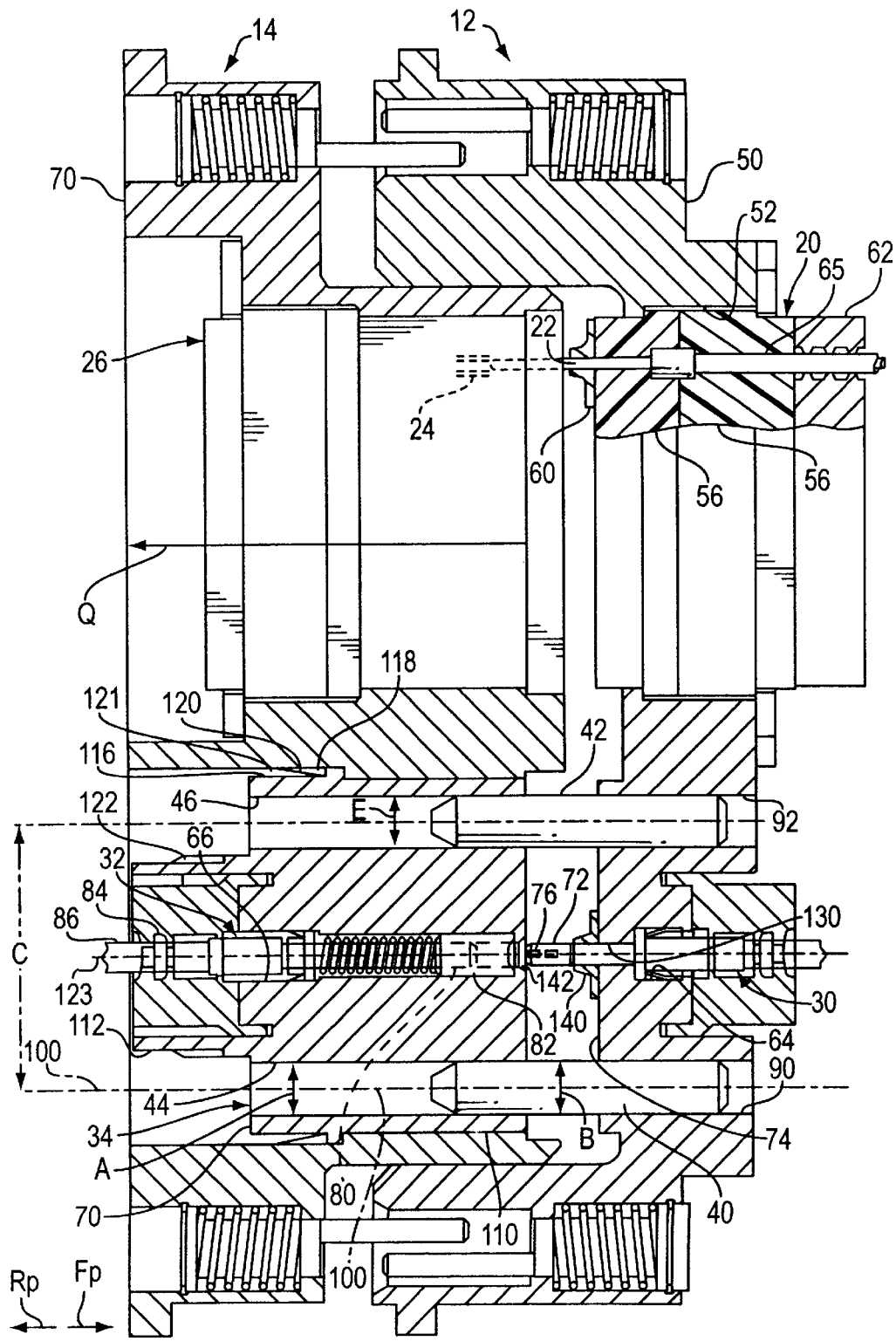
FIG. 2 is a sectional view of the system of FIG. 1, showing the connectors approaching each other, but not yet close enough to fully mate.

FIG. 2 shows the two connectors 12, 14 in the process of mating, but requiring movement of several millimeters towards each other for final or complete mating. The first connector includes a metal housing 50 that has been machined with a recess 52 to hold the first electrical contact insert 20. The first electrical contact insert includes a rigid insulative body 56 within which the electrical contacts 22 are mounted, and front and rear rubber like grommets 60, 62 for sealing out moisture. Wire conductors 65 are connected to rear ends of the contacts. The second electrical insert 26, of the second connector 14, is of similar construction and is held in a corresponding metal housing 70 of the second connector. Each first fiber optic terminal 30 lies in an aperture 64 bored in the metal housing 50 of the first connector. Each of the second fiber optic terminals 32 of the second connector lie in an aperture 66 formed in a metal frame 70, or insert housing, of the second fiber optic insert 34.

Each of the two fiber optic termini 30 of the first connector includes a ferrule 72 that projects from a front face 74 of the first housing, with an optical fiber 76 lying within the ferrule. Each mating fiber optic terminus 32 of the second connector includes mating front ends comprising a ferrule 80 that lies within a precision ceramic sleeve 82 that also can receive the ferrule 72 of the first connector. The terminus 32 has a rear end 84 that is coupled to an optic cable 86 that includes a fiber. The second ferrule 80 can move rearwardly in direction Rr under biasing of a spring, to assure that the extreme tips of the ferrules and of the optical fibers therein abut one another. It is well known that efficient transfer of light for butt-joint optic fiber coupling requires that the tips of the ferrules and fibers lie precisely concentric and with the ferrules and fibers oriented to extend precisely parallel to each other.

Precision alignment is assured by the alignment pins 40, 42 of the first connector that project into the alignment bores 44, 46 of the second connector. The metal housing 50 of the first connector has a pair of holes 90, 92 that receive the alignment pins 40, 42 in interference fit therein. The alignment bores 44, 46 of the second connector receive the pins in precision sliding fit therein. In one example, the first bore 44 has an inside diameter A of 0.2500 inch, while the corresponding pin 40 has an outside diameter B of 0.2495 inch. This results in a difference in diameters of 0.5 mil (one mil equals one thousandth inch) and a clearance around the pin 40 of 0.25 mil. The second alignment pin 42 and second bore 46 could be similarly constructed, except that this would require the distance C between the two bores and between the two pins to be held accurate within a few ten thousandths inch. Positioning the alignment bores 44, 46 and pins 40, 42 with their distances C held to this accuracy, would result in high cost. Applicant avoids this by forming the second bore 46 with a larger dimension E in a direction radial to the first bore 44 (i.e. radial to the axis 100 of the first bore).

FIG. 11 shows the two bores 44, 46 with the two pins 40, 42 lying therein, with FIG. 11A showing the region of the second bore and second pin. The first bore and first pin are centered on a first axis 100. The second pin 42 has a cylindrical portion lying in the second bore 46. The second bore 46 has the same width A in a lateral direction L as the first bore; the second bore width A is only a few ten thousandths inch greater than the diameter B of the second pin 42. However, the height E of the second bore (in a direction radial to axis 100) is much greater than the diameter B of the second pin. In one example, the height E of the second bore is 0.270 inch, leaving a clearance F above and below the pin of about 0.010 inch. The clearance F is preferably more than 0.001 inch. As a result, the function of the second bore 46 is to fix the lateral position (L) of the second pin, and to fix the angular position (in the circumferential direction D) of the second pin 42 about the first axis 100 to a small fraction of one degree. In a connector system that applicant designed, the distance C is 0.79 inch, so the alignment pins lie close to the optic termini. A lateral clearance G of 0.25 mil results in any pivoting of the pin 42 about the axis 100 at the center of the pin 40 being limited to about ten arc minutes. The difference 2G in width will almost always be less than 2 mils. No contact is desired between the second pin 42 and the longitudinally (M in FIG. 11A) opposite sides 101, 103 of the second bore 46. FIG. 11A shows that the pin 42 is of circular cross-section while the bore 46 is elongated in a longitudinal direction M. The circumferentially (with respect to axis 100) opposite sides 105,106 of the second pin 42 lie very close to the circumferentially opposite sides 107, 108 of the second bore 46.

The two bores 44, 46 are preferably formed on a milling machine wherein a rotating cutter is moved into the frame 70 and out again to form the first circular bore 44, the cutter then moved to the position of the second bore 46. The cutter is then moved into the frame 70 to form a hole, and with the rotating cutter still in the hole, the cutter is moved in a direction R that is radial to the first axis 100 (with R being parallel to M), to form a bore that is not precisely circular, but is elongated in a direction radial to the first axis 100.

FIG. 12 shows another construction, wherein the first pin 40 and first bore 44 are of the same construction as in FIG. 11. However, the second bore 46A is cylindrical, and therefore of circular cross-sections, but the second alignment pin 42A is not circular. The second alignment pin 42A is radially flattened in that it is formed with "flats" at 102, 104 so it has a small thickness in the radial or longitudinal directions R, M. With the thickness P of the second pin being no more than about one-third the original diameter B, the radial clearance (between pin 42A and bore 46A) in the longitudinal direction M is about three times the clearance in the lateral direction L. It is noted that while two alignment pins (e.g. 40, 42 in FIG. 2) are shown projecting from one connector to slideably fit into two bores in the other connector, it is possible to provide for only one alignment pin to project from each connector and to provide one alignment bore in each connector, with the two arrangements (one or two pins on a connector) being the equivalent of each other.

FIG. 10 is a rear isometric view of the second fiber optic insert 34, of the second connector. The front portion 110 must be of largely rectangular cross-section (as viewed along the axis of the connector and axis 123). Applicant prefers to form the rear portion 112 of substantially circular cross-sections. This has several advantages. One advantage is that this results in a circular retention surface 116. FIG. 2 shows that the retention surface 116 lies within a corresponding cylindrical surface 118 formed in the second housing 70, and with a retention clip 120 lying in the thin gap 121 between the retention surface 116 and the hole at 118 in the housing. The clip lies substantially against shoulders of opposite ends of the gap. Such retention clips 120 are readily available as reliable devices for retaining an insert, while enabling the insert to be readily removed and replaced by using a tool to cause the clip to release the insert. Such reliable clips are available only in circular shapes. The circular sectioned rear portion lies on an insert axis 123. A transition location 111 (FIG. 10) between circular and rectangular sections lies forward of the gap 121.

The rectangular insert front portion 110 has longitudinally spaced opposite ends 125, 127 extending beyond the threaded shank portion 122. The alignment bores 44, 46 extend through these overhanging end portions 125, 127. It can be seen that the rear portion 112 of the insert has a thread 122, which enables a protective backshell 124 to be readily attached to the insert by screwing the backshell into place on the thread 122. The round cross-section at the thread enables such attachment. By applicant providing the fiber optic insert 34 with a transition between the largely rectangular forward portion 110 of largely rectangular cross-section, and the largely circular rear portion 112 of largely circular cross-sections, applicant is able to provide the proper shape at the front of the connector while enhancing retention and connections at the rear of the insert.

In FIG. 2, it can be seen that applicant forms the first housing with apertures or bores 64 for receiving the fiber optic termini 30, where the bores 64 are formed directly in the metal housing 50. It would be possible to provide an insert similar to the insert 34 for the second connector. However, applicant avoids the need for a large insert-receiving hole and increases rigidity and reliability, by forming the optic terminus-receiving bores directly in the metal housing of the first connector. The forward portion 130 of each bore is especially useful to fix the orientation and position of the terminus ferrule 72 (although the sleeve 82 provides a high precision adjustment).

Figure 3:
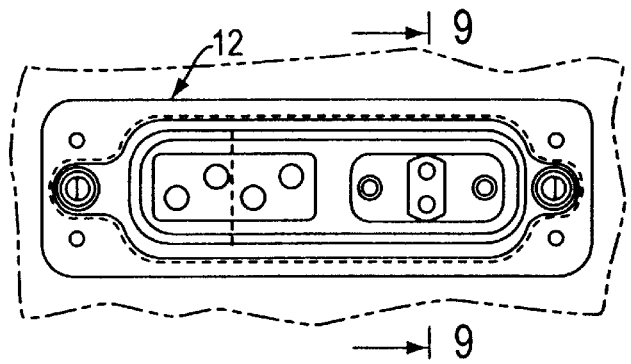
FIG. 3 is a front elevation view of the first, or receptacle connector of FIG. 1.
Figure 4:
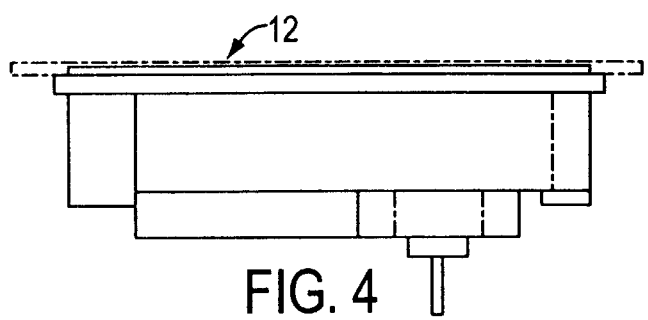
FIG. 4 is a side elevation view of the connector of FIG. 3.
Figure 5:
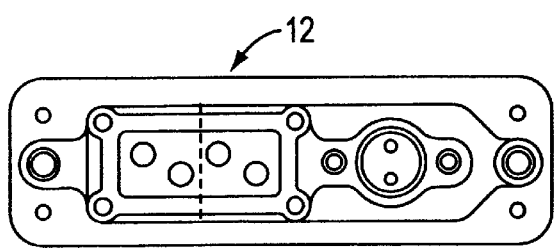
FIG. 5 is a rear elevation view of the connector of FIG. 3.
Figure 6:
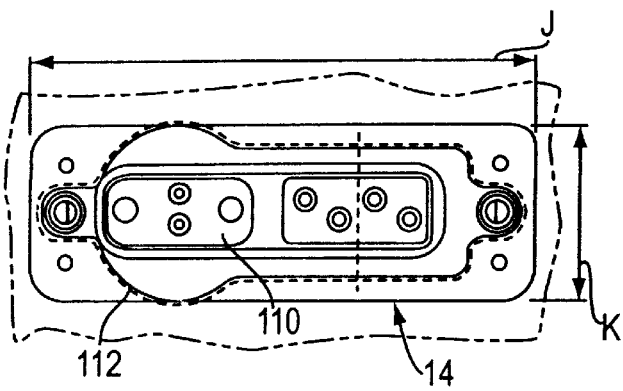
FIG. 6 is a front elevation view of the second, or plug connector of FIG. 1.
Figure 7:
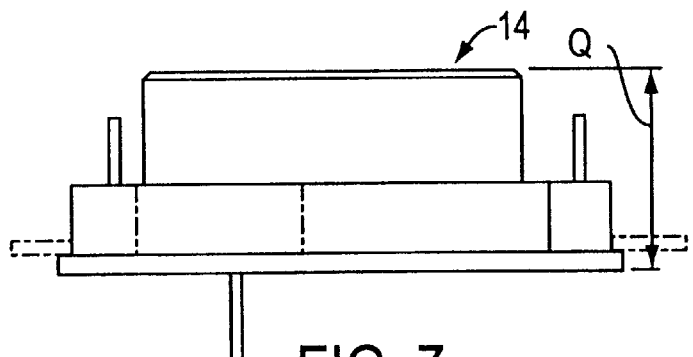
FIG. 7 is a side elevation view of the connector of FIG. 6.
Figure 8:
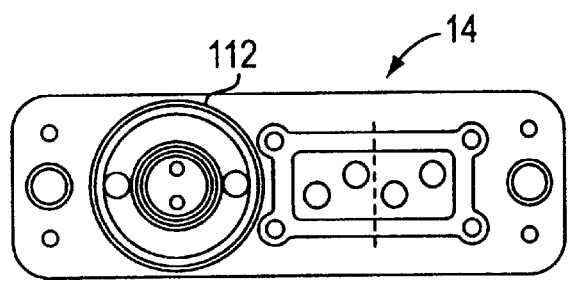
FIG. 8 is a rear elevation view of the connector of FIG. 6.
Figure 9:
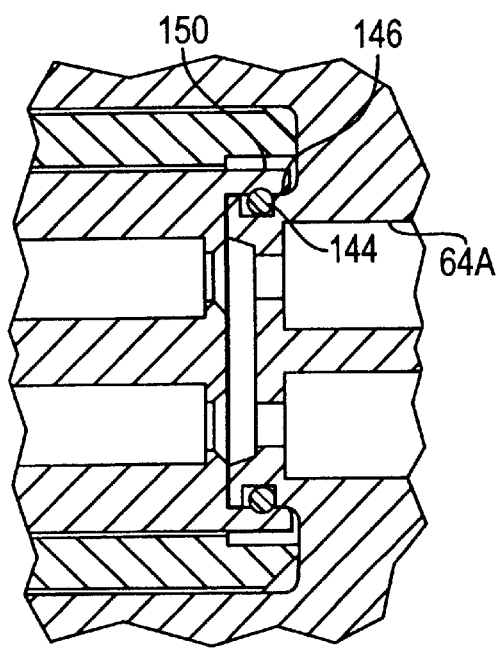
FIG. 9 is a partial sectional view of a pair of fully mated connectors of another embodiment of the invention.

FIG. 2 shows a cone-shaped rubber seal 140 around each first terminus, for providing a water tight seal with a hole in the second insert. FIG. 9 shows another arrangement (as would be seen on lines 9—9 of FIG. 3, but modified), where an O-ring 144 is provided that lies in a groove of a forwardly-projecting lip 146, to seal to a sleeve-like projection 150. An O-ring provides a more uniform sideward force to the termini ferrules that would lie in the bores 64A.

Applicant has designed a connector system of the construction shown in FIGS. 1–8 and 10–11. Each connector had an overall longitudinal length J of 3.744 inch (FIG. 6), and a lateral width K of 1.200 inch, with the second connector having a depth Q (FIG. 7) of 1.185 inch. FIG. 2 is drawn to show other dimensions accurately proportional to the length and depth.

Thus, the invention provides a connector system with connectors that can mate and that each has at least one fiber optic terminus that can mate with that of the other connector, which provides precision alignment of the fiber optic termini and which provides an insert with a rear portion constructed to ease retention and connection. A pair of alignment pins projecting from one connector are received in a pair of alignment bores in the other connector, with a first pin and bore having precision cylindrical surfaces that are closely engaged, and with a second pin end bore constructed to precisely fix their circumferential position with respect to the axis at the first pin bore, but to avoid fixing their radial positions with respect to the axis of the first pin and bore. An insert for one of the connectors has a largely rectangular front portion for fitting into a correspondingly-shaped cavity formed in the connector housing. However, the rear of the insert is constructed to have largely circular cross-sections, which facilitates the use of a retaining clip and the use of an external thread. One or more bores in a first connector for receiving optic fiber termini, are bored directly into the metal housing of the first connector for added precision and durability. The first connector housing has an aperture for receiving an electrical connector insert that contains electrical connectors, whose positions are not as critical as required for optic fiber termini.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A connector system comprising:

first and second connectors that can mate by moving the connectors together, said second connector having first and second alignment bores and said first connector having first and second alignment pins for projecting respectively into said first and second bores;

said first bore and said first pin each having interfitting cylindrical portions lying on a first axis to precisely fix the relative positions of said connectors at said first pin and first bore, in directions perpendicular to said first axis, said second bore and said second pin each being spaced in a radial direction from said first axis;

said second bore and said second pin each having a pair of circumferentially opposite sides that are circumferentially spaced apart with respect to said first axis with small circumferential clearances (G) between them, but said second bore and said second pin have radially opposite ends that are radially spaced with respect to said first axis and that have clearances (F) between them that are each a plurality of times greater than each of said circumferential clearances, so said second bore and pin do not fix their radial positions with respect to said first axis.

2. The connector system described in claim 1 wherein:

said circumferential clearance (G) is no more than a few ten thousandths inch, while said clearances (F) at said radially opposite ends are more than one thousandth inch.

3. A connector comprising:

a housing having an axis extending in front and rear axial directions and having an axially extending through aperture, said aperture having walls forming an aperture front end portion of largely rectangular cross-section and an aperture rear end portion;

an insert having a substantially rectangular insert front portion that lies closely in said aperture front end portion and having an insert rear portion, said insert having at least one connector element with a front mating end and a rear end;

said insert rear portion and said aperture rear portion forming a clip-holding gap between them, with said insert rear portion forming a rearwardly-facing shoulder at the front of said gap and said aperture forming a forwardly-facing shoulder at the rear of said gap;

a retainer clip lying in said gap and positioned to engage said shoulders, with said clip being circular, and with said aperture and said insert having a rectangle-to-circle transition forward of said gap, so the walls of said aperture and of said insert are of circular cross-sections at said gap.

4. The connector described in claim 3 wherein:

said insert has an insert axis extending parallel to said housing axis, and said insert rear portion includes a threaded shank portion lying on said insert axis rearward of said gap and having a thread diameter that is smaller than the outside diameter of said insert at said gap;

said rectangular insert front portion has opposite ends that each projects radial to said insert axis by a distance greater than the radius of said threaded shank portion to provide an overhanging rectangular end portion that lies beyond said shank as viewed along said insert axis;

a pair of alignment pin-receiving holes each extending parallel to said insert axis and projecting through one of said overhanging rectangle end portions.

5. A connector system comprising:

first and second connectors that can mate by moving the connectors together, said second connector having first and second alignment bores and said first connector having first and second alignment pins for projecting respectively into said first and second bores;

said first bore and said first pin each having interfitting cylindrical portions lying on a first axis to precisely fix the relative positions of said connectors at said first pin and first bore, in directions perpendicular to said first axis, said second bore and said second pin each being spaced in a radial direction from said first axis;

said second bore and said second pin each having a pair of circumferentially opposite sides that are circumferentially spaced apart with respect to said first axis with small circumferential clearances (G) between them, but said second bore and said second pin have radially opposite ends that are radially spaced with respect to said first axis and that have clearances (F) between them that are each a plurality of times greater than each of said circumferential clearances, so said second bore and pin do not fix their radial positions with respect to said first axis;

said second pin has a cylindrical pin portion lying in said second bore, but said second bore has a bore portion surrounding said pin portion with said bore portion having a greater radial length in a direction radial to said first axis than its circumferential width in a direction that is circumferential to said first axis.

6. A connector system comprising:

first and second connectors that can mate by moving the connectors together, said second connector having first and second alignment bores and said first connector having first and second alignment pins for projecting respectively into said first and second bores;

said first bore and said first pin each having interfitting cylindrical portions lying on a first axis to precisely fix the relative positions of said connectors at said first pin and first bore, in directions perpendicular to said first axis, said second bore and said second pin each being spaced in a radial direction from said first axis;

said second bore and said second pin each having a pair of circumferentially opposite sides that are circumferentially spaced apart with respect to said first axis with small circumferential clearances (G) between them, but said second bore and said second pin have radially opposite ends that are radially spaced with respect to said first axis and that have clearances (F) between them that are each a plurality of times greater than each of said circumferential clearances, so said second bore and pin do not fix their radial positions with respect to said first axis;

said second pin has a flattened pin portion lying in said second bore and said second bore has a cylindrical bore portion that surrounds said flattened pin portion, but while said flattened pin portion has a circumferential width substantially equal to the circumferential width of said cylindrical bore portion to leave a very small circumferential clearance thereat, said flattened pin portion has a radial length that is less than its circumferential width to leave a much larger radial clearance thereat that is a plurality of times greater than said circumferential clearance.

* * * * *